United States Patent
Huang

(10) Patent No.: US 8,844,373 B2
(45) Date of Patent: Sep. 30, 2014

(54) EXTERIOR PRESSURE DETECTION DEVICE FOR DETECTING FLUID PRESSURE IN PIPES

(76) Inventor: Chung-Yi Huang, Taichung (TW)

(*) Notice: Subject to any disclaimer, the term of this patent is extended or adjusted under 35 U.S.C. 154(b) by 327 days.

(21) Appl. No.: 13/436,882

(22) Filed: Mar. 31, 2012

(65) Prior Publication Data

US 2013/0205909 A1  Aug. 15, 2013

(30) Foreign Application Priority Data

Feb. 13, 2012 (TW) .............................. 101202527 A

(51) Int. Cl.
*G01F 1/38* (2006.01)
*G01L 7/06* (2006.01)
*G01L 9/00* (2006.01)

(52) U.S. Cl.
CPC .............. *G01F 1/386* (2013.01); *G01L 9/0001* (2013.01)
USPC .......................................... 73/861.47; 73/730

(58) Field of Classification Search
None
See application file for complete search history.

(56) References Cited

U.S. PATENT DOCUMENTS

| | | | |
|---|---|---|---|
| 2,065,215 A * | 12/1936 | Farmer et al. ................. | 188/203 |
| 2,274,479 A * | 2/1942 | Inderdohnen et al. .......... | 73/730 |
| 2,747,821 A * | 5/1956 | Falk ................................ | 248/71 |
| 3,866,473 A * | 2/1975 | Teitelbaum et al. ............ | 73/726 |
| 3,965,745 A * | 6/1976 | Carey ............................. | 73/723 |
| 4,174,637 A * | 11/1979 | Mulzet et al. .................... | 73/730 |
| 4,290,311 A * | 9/1981 | Brewer ........................... | 73/730 |
| 4,425,800 A * | 1/1984 | Claassen et al. ................ | 73/730 |
| 4,731,556 A * | 3/1988 | Adams .......................... | 310/338 |
| 4,840,068 A * | 6/1989 | Mayhew, Jr. ..................... | 73/730 |
| 4,911,004 A * | 3/1990 | Leon .............................. | 73/168 |
| 5,024,099 A * | 6/1991 | Lee ................................ | 73/730 |
| 5,161,395 A * | 11/1992 | Wethington ................. | 68/205 R |
| 5,218,970 A * | 6/1993 | Turnbull et al. ............. | 600/561 |
| 5,721,382 A * | 2/1998 | Kriesel et al. ............. | 73/861.47 |
| 5,843,035 A * | 12/1998 | Bowman et al. .............. | 604/122 |
| 5,980,102 A * | 11/1999 | Stulen et al. ..................... | 374/45 |
| 6,070,470 A * | 6/2000 | Harms et al. .................... | 73/730 |
| 6,622,565 B2 * | 9/2003 | Kincaid et al. .................. | 73/730 |
| 6,722,205 B2 * | 4/2004 | Bodin ............................ | 73/756 |

* cited by examiner

*Primary Examiner* — Lisa Caputo
*Assistant Examiner* — Gregory A Royal

(57) ABSTRACT

An exterior pressure detection device for detecting fluid pressure in pipes includes a body in which a circuit board and a pressure detection unit are received. The pressure detection unit includes a board and a pressure detecting chip which is electrically connected to the circuit board. An L-shaped clamping bar has a connection section and a clamping section which is parallel to the board. A pipe is clamped between the board and the clamping section. When the volume of the fluid passing through the pipe and changes the diameter of the pipe, the board is moved to activate the pressure detecting chip which transfer the change of the diameter of the pipe into a signal which is sent to the exterior main controlling device via the signal output device of the circuit board.

9 Claims, 4 Drawing Sheets

EXTERIOR PRESSURE DETECTION DEVICE FOR DETECTING FLUID PRESSURE IN PIPES

FIELD OF THE INVENTION

The present invention relates to a fluid pressure detection device, and more particularly, to an exterior pressure detection device for detecting fluid pressure in pipes.

BACKGROUND OF THE INVENTION

The conventional way to detect the fluid pressure in pipes for a machine is to install detection members in the pipes and when the fluid passes through the pipes, the detection members detect the pressure of the fluid and the send a signal to the main control system so that the users can judge the signals and take proper actions to the fluid or the pipes.

However, for the pipes of vehicles, the pipes cannot be installed with the detection members due to the restriction of the structure of the pipes of vehicles. Furthermore, even if the pipes of vehicles can be installed with the detection members, not every vehicle can be installed with the detection members so that the volume and the pressure of the fluid for the vehicles cannot be easily detected.

The present invention intends to provide an exterior pressure detection device for detecting fluid pressure in pipes so that the pressure of the fluid in the pipes can be detected from outside of the pipes.

SUMMARY OF THE INVENTION

The present invention relates to an exterior pressure detection device for detecting fluid pressure in pipes and comprises a body in which a circuit board and a pressure detection unit are received. The circuit board comprises a signal output device, a direct current power part, a button and multiple light emitting members. The pressure detection unit includes a board and a pressure detecting chip which is electrically connected to the circuit board. An L-shaped clamping bar has a connection section connected to the body, and a clamping section which is parallel to the board. A pipe is clamped between the board and the clamping section. When the volume of the fluid passing through the pipe and changes the diameter of the pipe, the board is moved to activate the pressure detecting chip which transfer the change of the diameter of the pipe into a signal which is sent to the exterior main controlling device via the signal output device of the circuit board.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
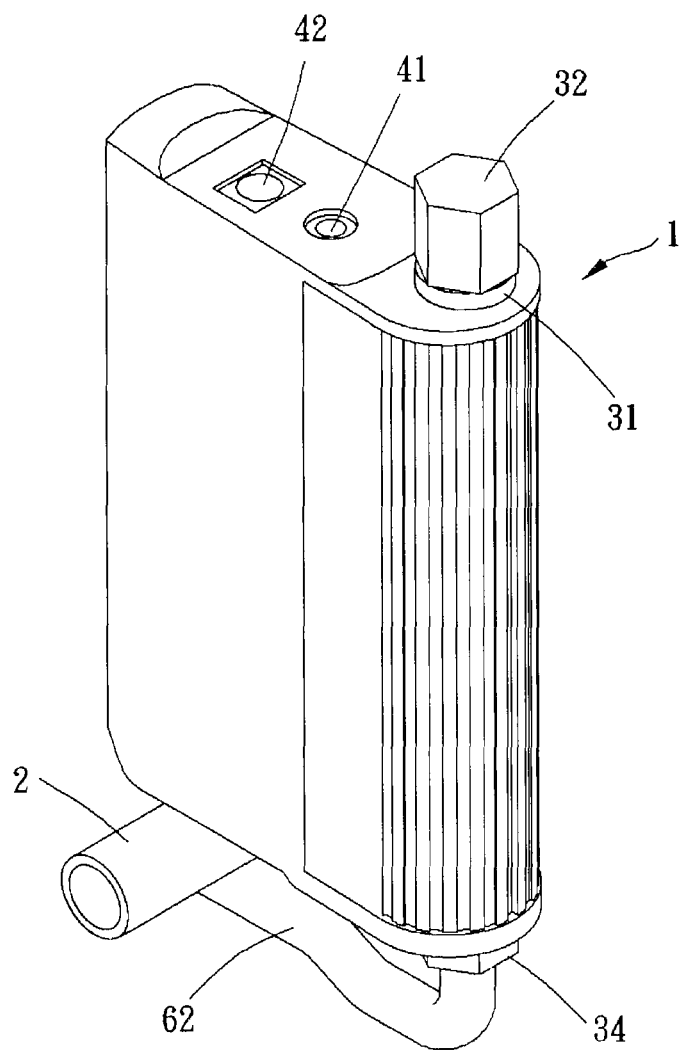
FIG. 1 is a perspective view to show the exterior pressure detection device of the present invention.
Figure 2:
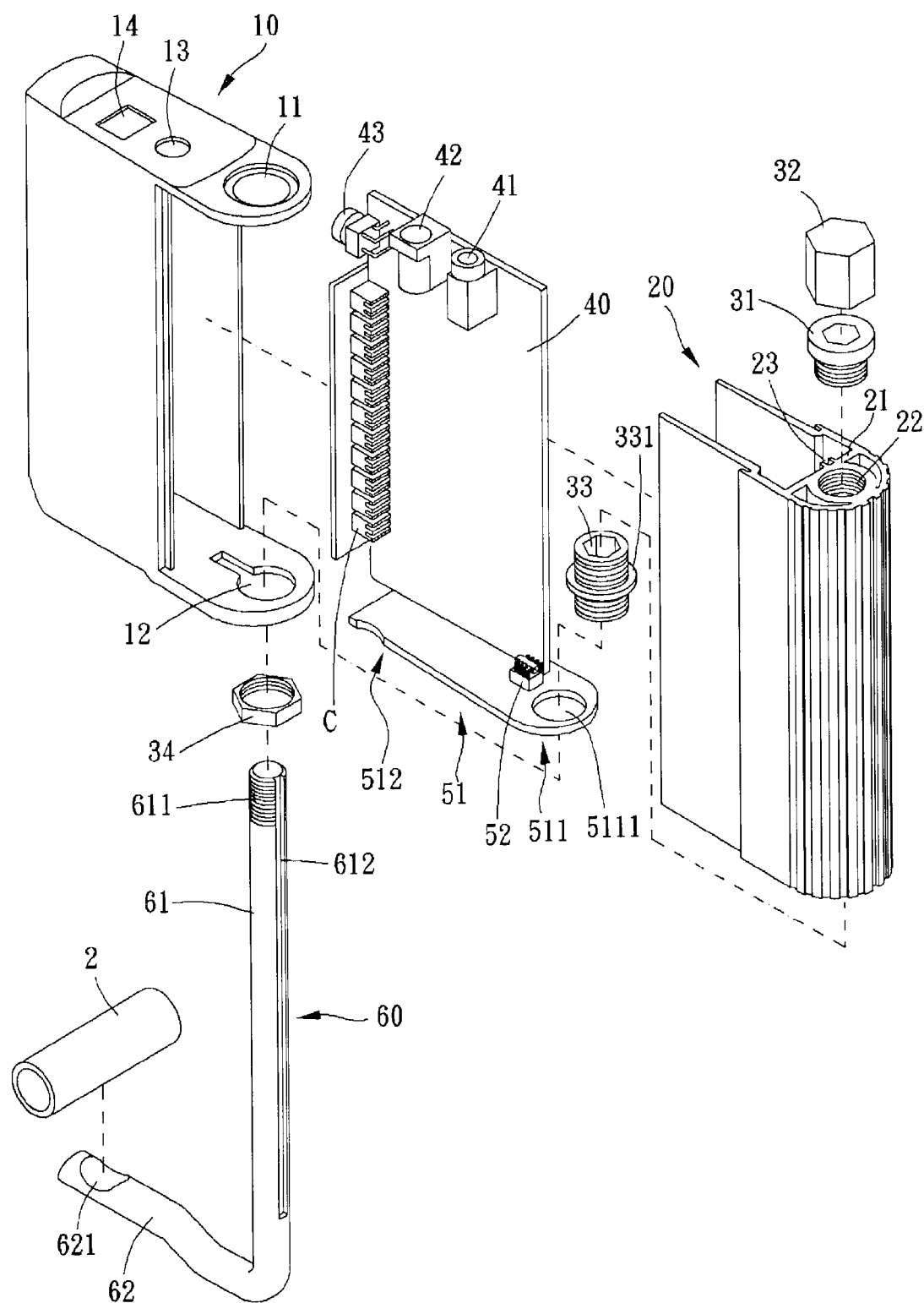
FIG. 2 is an exploded view to show the exterior pressure detection device of the present invention.
Figure 3:
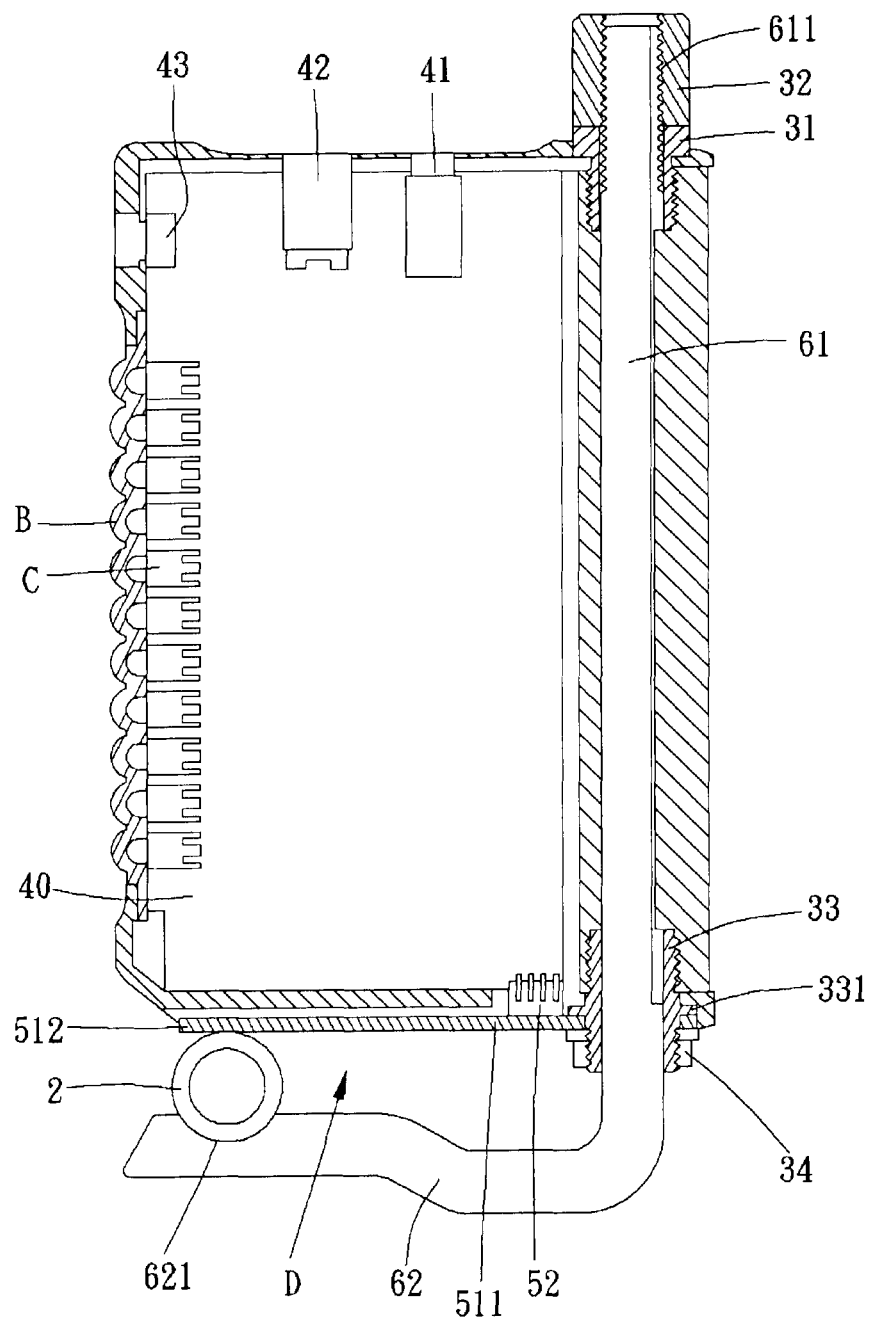
FIG. 3 is a side cross sectional view of the exterior pressure detection device of the present invention.
Figure 4:
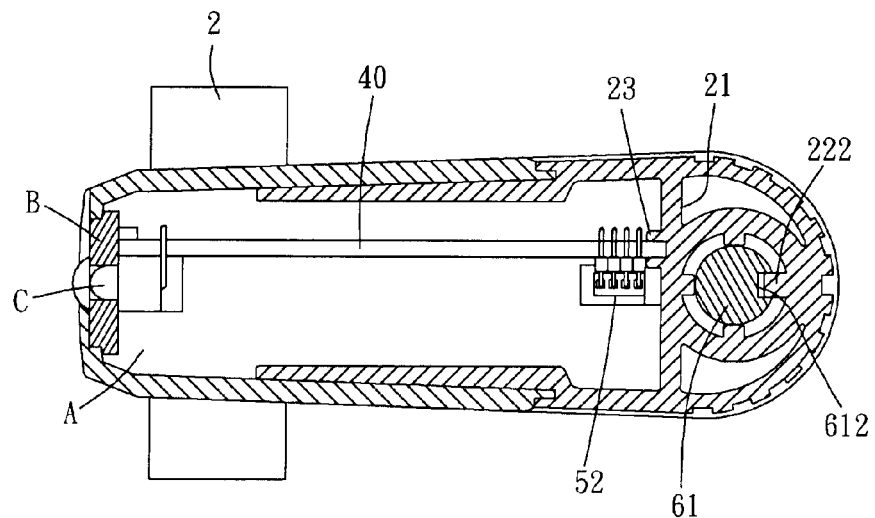
FIG. 4 is an end cross sectional view of the exterior pressure detection device of the present invention.
Figure 5:
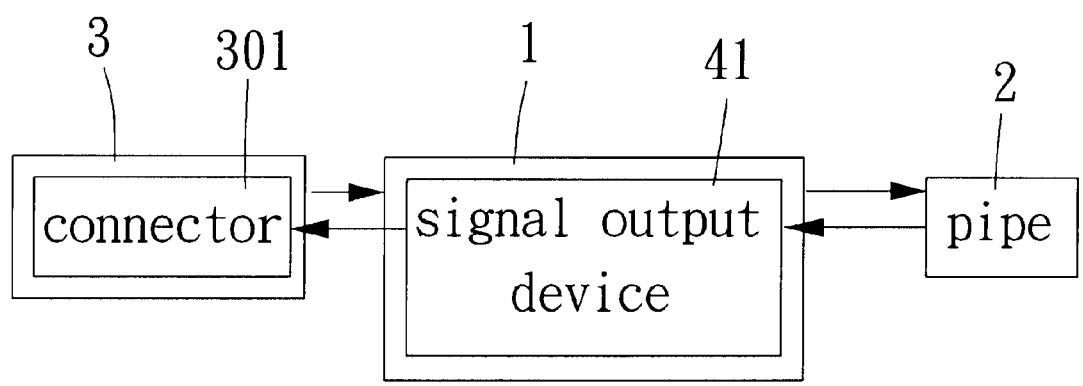
FIG. 5 shows the operation relationship between the exterior main controlling device, the exterior pressure detection device of the present invention and the pipe.

Referring to FIGS. 1 to 5, the exterior pressure detection device 1 of the present invention is a media between the pipe 2 and the exterior main controlling device 3 (FIG. 5), and the exterior pressure detection device 1 comprises a body which is composed of a first part 10 and a second part 20 which is connected to the first part 10 so as to define an interior space "A" between. Each of the first and second parts 10, 20 has a top end, a bottom end, a closed end connected between the top end and the bottom end, and an open end which is located in opposite to the closed end. A top hole 11 and a bottom hole 12 are respectively defined through the top end and the bottom end of the open end of the first part 10. The first part 10 has a first hole 13 and a second hole 14 defined close to the top hole 11. A separation plate 21 is located close to the closed end of the second part 20 and a connection portion 22 is located in the closed end of the second part 20. The connection portion 22 is a hollow and tubular part which opens to the top end and the bottom end of the second part 20. A first connection unit and a second connection unit are respectively connected to a top end and a bottom end of the hollow portion 22. The connection portion 22 has four ribs 222 extending from the inner periphery thereof. The separation plate 21 has a guide passage 23 defined in a side opposite to the connection portion 22. The first connection unit comprises a hollow T-shaped first threading member 31 and a first tightening member 32 which has inner threads. The second connection unit comprises a hollow second threading member 33 and a second tightening member 34. The second threading member 33 has a flange 331 extending outward from the mediate portion thereof and the second tightening member 34 has a hexagonal outside.

The circuit board 40 is located in the interior space "A" and has one end inserted into the guide passage 23 of the separation plate 21. The circuit board 40 has a signal output unit, a direct current power part 42, a button 43 and multiple light emitting members "C". The signal output unit sends signals to the exterior main controlling device 3 and can be a wired or wireless device according to the type of the exterior main controlling device 3. If the signal output unit of the circuit board 40 is a wireless device, then it can be a wireless emitting device which is cooperated with a wireless receiving device on the exterior main controlling device 3. If the signal output unit of the circuit board 40 is a wired device, the signal output unit of the circuit board 40 is a signal output device 41 which is connected with a connector 301 (FIG. 5) of the exterior main controlling device 3. The signal output device 41 is located corresponding to the first hole 13 of the first part 10. The direct current power part 42 is located corresponding to the second hole 14 so that the circuit board 40 is powered via the direct current power part 42. The button 43 is provided to the circuit board 40 so as to push the button 43 to detect the pressure of the fluid in the pipe 2. The multiple light emitting members "C" of the circuit board 40 can be seen via a light-permeable board "B" and preferably, multiple light emitting members "C" are Light Emitting Diodes.

The pressure detection unit is electrically connected to the circuit board 40 and transfers the detected pressure signal to the exterior main controlling device 3 via the signal output unit. The pressure detection unit comprises a board 51 and a pressure detecting chip 52. The board 51 has a fixing end 511 and a movable end 512. The fixing end 511 has a through hole 5111 which is located corresponding to the connection portion 22. The second threading member 33 extends through the bottom hole 12 and is threadedly connected to the connection portion 22. The fixing end 5111 or the board 51 is then mounted to the lower section of the second threading member 33 and the second tightening member 34 is then connected to the second threading member 33 to lock the fixing end 511 to the body. The movable end 512 of the board 51 maintains a distance from the body and is movable relative to the body. The pressure detecting chip 52 has a first end electrically connected to the electric board 40 and a second end of the pressure detecting chip 52 is directly or indirectly connected to the board 51.

An L-shaped clamping bar 60 has a connection section 61 and a clamping section 62 which is substantially perpendicular to the connection section 61. The connection section 61 of the clamping bar 60 has a threaded section 611 at the distal end thereof. A groove 612 is axially defined in the outside of the connection section 61 and one of the ribs 222 is movably engaged with the groove 612. The connection section 61 extends through the through hole 5111, the bottom hole 12, the second tightening member 34, the second threading member 33, the connection portion 22 of the body and the first threading member 31, and the threaded section 611 is tightened by the first tightening member 32. The clamping section 62 is located parallel to the board 51 on one side of the pressure detection unit. A clamping space "D" is defined between the clamping section 62 and the pressure detection unit. The clamping section 62 of the clamping bar 60 has a recess 621 defined in the outside thereof and the recess 621 is located corresponding to the board 51 so that the pipe 2 in the clamping space "D" is clamped between the recess 621 and the board 51.

When using the exterior pressure detection device 1 of the present invention, the first tightening member 32 and the first threading member 31 are loosened to adjust the width of the clamping space "D" by moving the clamping section 62 of the clamping bar 60 away from the board 51. The pipe 2 to be detected is then clamped between the recess 621 of the clamping section 62 of the clamping bar 60 and the board 51 by tightening the first tightening member 32 and the first threading member 31. The button 43 is then pushed, when the pressure of the interior of the pipe 2 is high, the pipe 2 is inflated to move the movable end 512 of the board 51. The pressure detecting chip 52 that is in contact with the board 51 detects the displacement of the board 51 and transfers the displacement into a signal which is sent to the exterior main controlling device 3 via the signal output device 41. The users then acknowledge the pressure in the pipe 2. In the meanwhile, the light emitting members "C" on the circuit board 40 are activated according to the pre-set conditions so that the users can check the number of the light emitting members "C" that are activated to acknowledge the pressure in the pipe 2.

The present invention allows the users to detect the pressure in the pipe 2 from outside of the pipe 2 and the clamping space "D" can be adjusted to clamp the pipes 2 of different sizes.

While we have shown and described the embodiment in accordance with the present invention, it should be clear to those skilled in the art that further embodiments may be made without departing from the scope of the present invention.

What is claimed is:

1. An exterior pressure detection device for detecting fluid pressure in pipes, and comprising:
    a body having an interior space defined therein and a connection portion located on a side of the body;
    a circuit board located in the interior space and having a signal output unit, a direct current power part and a button;
    a pressure detection unit electrically connected to the circuit board and transferring the detected pressure signal to an exterior main controlling device via the signal output unit, and
    an L-shaped clamping bar having a connection section and a clamping section, the connection section extending through the connection portion of the body, the clamping section located parallel to a side of the pressure detection unit, a clamping space being defined between the clamping section and the pressure detection unit.

2. The device as claimed in claim 1, wherein pressure detection unit comprises a board and a pressure detecting chip, the board has a fixing end and a movable end, the fixing end having a through hole which is located corresponding to the connection portion, the connection section of the clamping bar extends through the through hole and the connection portion to be connected to the body, a distance is defined between the movable end of the board and the body, the movable end is movable relative to the body, the pressure detecting chip has a first end electrically connected to the electric circuit board and a second end of the pressure detecting chip is directly or indirectly connected to the board.

3. The device as claimed in claim 2, wherein the body comprises a first part and a second part which is connected to the first part, each of the first and second parts has a top end, a bottom end, a closed end connected between the top end and the bottom end, and an open end which is located in opposite to the closed end, a top hole and a bottom hole are respectively defined through a top end and a bottom end of the open end of the first part, a separation plate is located close to the closed end of the second part and the connection portion is located in the closed end of the second part, the connection portion is a hollow and tubular part which opens to the top end and the bottom end of the second part, a first connection unit and a second connection unit are respectively connected to a top end and a bottom end of the hollow portion, the first connection unit is connected with the connection section of the connection bar and the second connection unit connects the fixing end of the board to the body.

4. The device as claimed in claim 3, wherein the clamping section of the clamping bar has a recess defined in an outside thereof and the recess is located corresponding to the board.

5. The device as claimed in claim 4, wherein the first connection unit comprises a hollow T-shaped first threading member and a first tightening member which has inner threads, the second connection unit comprises a hollow second threading member and a second tightening member, the hollow second threading member has a flange extending outward from an mediate portion thereof and the second tightening member has a hexagonal outside, the connection section of the clamping bar has a threaded section at a distal end thereof and a groove is axially defined in an outside of the connection section, the connection portion has at least one rib extending from an inner periphery thereof, the at least one rib is engaged with the groove of the connection section.

6. The device as claimed in claim 5, wherein the signal output unit of the circuit board is an electronic signal output device.

7. The device as claimed in claim 5, wherein the signal output unit of the circuit board is a wireless emitting device.

8. The device as claimed in claim 6, wherein the circuit board has multiple light emitting members.

9. The device as claimed in claim 8, wherein the light emitting members are Light Emitting Diodes.

\* \* \* \* \*